(12) United States Patent
Ko et al.

(10) Patent No.: US 12,415,282 B2
(45) Date of Patent: Sep. 16, 2025

(54) BATHING ROBOT DEVICE

(71) Applicants: Young Ji Ko, Seoul (KR); Jung Soo Ko, Seoul (KR); Dae Yong Ko, Seoul (KR)

(72) Inventors: Young Ji Ko, Seoul (KR); Jung Soo Ko, Seoul (KR); Dae Yong Ko, Seoul (KR)

(73) Assignees: Young Ji Ko, Seoul (KR); Jung Soo Ko, Seoul (KR); Dae Yong Ko, Seoul (KR)

( * ) Notice: Subject to any disclaimer, the term of this patent is extended or adjusted under 35 U.S.C. 154(b) by 418 days.

(21) Appl. No.: 18/003,909

(22) PCT Filed: Jun. 29, 2021

(86) PCT No.: PCT/KR2021/008171
§ 371 (c)(1),
(2) Date: Dec. 29, 2022

(87) PCT Pub. No.: WO2022/005162
PCT Pub. Date: Jan. 6, 2022

(65) Prior Publication Data
US 2023/0264361 A1  Aug. 24, 2023

(30) Foreign Application Priority Data

Jun. 30, 2020  (KR) .................. 10-2020-0080613

(51) Int. Cl.
*B25J 11/00* (2006.01)
*A61G 7/00* (2006.01)
*A61H 33/00* (2006.01)

(52) U.S. Cl.
CPC ......... *B25J 11/0085* (2013.01); *A61G 7/0005* (2013.01); *A61H 33/005* (2013.01);
(Continued)

(58) Field of Classification Search
CPC ................ A61G 7/0005; A61H 33/005; A61H 2201/1664; A61H 2201/5092
See application file for complete search history.

(56) References Cited

U.S. PATENT DOCUMENTS 6,594,837 B2 *  7/2003  Khait .................. A61G 7/0005
5/5

FOREIGN PATENT DOCUMENTS

JP           9-192194 A       7/1997
KR       100249911 B1 *    3/2000
(Continued)

OTHER PUBLICATIONS

Translation of KR 102115297 (2025).*
(Continued)

*Primary Examiner* — Janie M Loeppke
(74) *Attorney, Agent, or Firm* — BROADVIEW IP LAW, PC

(57) ABSTRACT

The present invention relates to a bathing robot device which: can perform the bathing, washing, cleaning, drying, skin caring, disinfecting, or sterilizing of an object; can use technology such as electronic control, artificial intelligence, or IT to autonomously perform corresponding functions without depending on only manpower; and can interact/communicate with an external device. The bathing robot device performs functions of: in a state in which the object is fixed without moving at one position, cleaning or washing the object by spraying water and a cleaning agent to the object; sensing ending of the cleaning or the washing, and drying the object by blowing air; and then, if necessary, spraying a lotion, a medicine, etc. Further, the bathing robot also performs a function of washing and drying an external device such as an object transfer device or a bathing table.

8 Claims, 18 Drawing Sheets

(52) U.S. Cl.
CPC . *A61H 33/6021* (2013.01); *A61H 2201/1664* (2013.01); *A61H 2201/5092* (2013.01)

(56) References Cited

FOREIGN PATENT DOCUMENTS

| KR | 10-2001-0082952 A | | 8/2001 |
|---|---|---|---|
| KR | 10-2012-0014430 A | | 2/2012 |
| KR | 20120014430 A | * | 2/2012 |
| KR | 10-2018-0044013 A | | 5/2018 |
| KR | 102115297 B1 | * | 5/2020 |

OTHER PUBLICATIONS

Translation of KR 20120014430 (2025).*
Translation KR 100249911 (2025).*
International Search Report for PCT/KR2021/008171 by Korean Intellectual Property Office dated Sep. 17, 2021.

* cited by examiner

BATHING ROBOT DEVICE

CROSS-REFERENCE TO RELATED APPLICATIONS

This application is a National Phase Entry Application of PCT Application No. PCT/KR2021/008171 filed on Jun. 29, 2021, which claims priority to Korean Patent Application No. 10-2020-0080613 filed on Jun. 30, 2020, in Korean Intellectual Property Office, the entire contents of which are hereby incorporated by reference in its entirety.

TECHNICAL FIELD

The present invention relates to mechatronics, automatic control, artificial intelligence, information and communication, and robot technology required for performing bathing, washing, cleaning, drying, skincare, disinfecting, or sterilizing on a less mobile person such as a patient, a disabled person, an elderly person, or an infant, an animal, or a thing and performing communication with an external environment.

BACKGROUND ART

Bathing devices for bathing less-mobile persons such as patients, disabled persons, elderly persons, or infants are known. However, most conventional bathing devices do not have functions other than a function of washing a body using water and a cleaning agent in which a patient or the like sits or lies, and the devices are fixed and the patient or the like is moved to perform cleaning, which causes a safety risk. In addition, there is a risk of infection with viruses, germs, or bacteria through face-to-face contact with patients. Moreover, there is no bathing device having a communication or cooperation function with an external environment or device. Such problems apply not only to persons such as patients or disabled persons but also to objects such as various animals (for example, dogs, cats, lions, horses, and crocodiles).

An example of the conventional automatic bathing device is disclosed in Korean Publication Patent No. 10-2001-0082952 (published on Aug. 31, 2001). In Korean Publication Patent No. 10-2001-0082952, the conventional automatic bathing device is an automatic bathing device including a box-shaped case having a hole, into which a head of a person is inserted, formed in an upper end thereof, a chair formed of a net fixed to an upper wall, a lower wall, a left wall, and a right wall inside the case by a fixing device for a person to sit thereon, a cover which is formed in front of the case and is horizontally pivoted on a hinge attached to a side surface of the case, and a spray nozzle configured to spray bath water into the case and cover.

DISCLOSURE

Technical Problem

The present invention is directed to providing a bathing robot device which is capable of, in addition to a simple bathing function of cleaning a body using water and a cleaning agent in a state in which a person sits or lies, automatically, conveniently, and safely performing bathing (cleaning), washing, drying, skincare, disinfecting, or sterilizing on patients or disabled persons as well as various animals or objects in a non-face-to-face manner and adopts a robot concept that utilizes technologies such as electronic control, artificial intelligence, and information technology (IT) to autonomously perform corresponding functions and perform interaction/communication with external environments or devices without depending only on manpower.

Technical Solution

In order to solve the above problems, a bathing robot device (hereinafter referred to as "bathing robot") is provided. The bathing robot of the present invention sprays water and a cleaning agent to wash or clean an object inside a device reciprocating above the object in a state in which the object such as a patient, a disabled person, an elderly person, an infant, an animal, or a thing is fixed at one position without movement, detects that the object has been washed and cleaned, blows air to dry the object, and then performs a function of spraying a lotion or chemicals for skincare or sterilization or radiating light from a sterilization lamp as needed. The bathing robot also performs a function of cleaning and drying an external device such as an object transfer device or a bathing stand (table). In addition, the bathing robot may autonomously communicate and collaborate with other devices according to a type of object. Here, "objects" include not only patients, disabled persons, elderly persons, and infants, but also animals such as dogs, cats, wild beasts, and crocodiles, and objects such as furniture, equipment, and devices.

According to an embodiment of the present invention, a bathing robot device includes a house reciprocating along a track, a house rail configured to guide the house to reciprocate, and an external device rail serving as a railroad to position an external device carrying an object in a correct position. The house includes a nozzle configured to supply and spray water to the external device coupled to the external device rail, a nozzle configured to supply and spray a cleaning agent, a device configured to perform a drying function, and a device configured to perform skincare or sterilization.

The house may further include a camera configured to scan the object on the external device, and a part which analyzes an image, which is acquired by scanning the object using the camera, to determine an amount and type of consumables required for bathing, drying, and skincare of the object and adjust a bathing time.

The bathing robot device may have a function of autonomously communicating with an external environment and may further include an autonomous execution unit configured to autonomously operate a reciprocating motion of the house and autonomously operate the nozzle configured to supply and spray water, the nozzle configured to supply and spray a cleaning agent, the device configured to perform a drying function, and the device configured to perform skincare or sterilization.

Advantageous Effects

According to the present invention, since a bathing device moves to perform functions such as bathing (cleaning), drying, skincare, and sterilizing in a state in which an object to be bathed/cleaned such as a person, an animal, or a thing is fixed at one position without movement, various functions can be performed safely and automatically. In addition, a communication or collaboration function with an environment or external device is provided so that a function of calling and cooperating with a guardian or external device can be autonomously performed. In addition, it is possible to avoid infection with viruses, germs, or bacteria through face-to-face contact with patients.

MODES OF THE INVENTION

As embodiments of the present invention, a bathing robot will be described. Advantages and features of the present invention and methods of achieving them will become more apparent with reference to embodiments described in detail in conjunction with the accompanying drawings. However, the present invention is not limited to the embodiments described below. The embodiments serve only to complete the disclosure of the present invention and are provided to fully inform those of ordinary skill in the art of the scope of the present invention, and the present invention is defined by the description of the claims In the embodiments described below, a subject (object) to be bathed is assumed to be a user such as a patient, a disabled person, an elderly person, or an infant. Here, the user is used to mean not only a patient or a disabled person, but also an ordinary person.

<Configuration and Operation of Bathing Robot>

Figure 1:
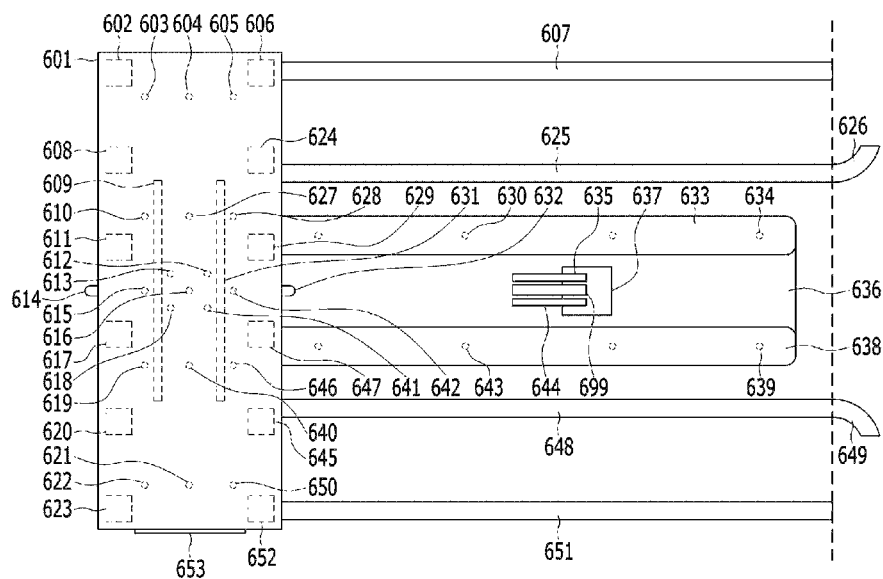
FIG. 1 is a plan view of a bathing robot.

FIG. 1 is a plan view of a bathing robot device (hereinafter referred to as "bathing robot") according to the present invention.

There are house rails 607 and 651 which guide a tunnel-shaped house 601, which is a major component of the bathing robot, to reciprocate along a certain track. In addition, there are entry guides 626 and 649 which guide an external device (for example, a patient transfer device or a bathing stand (table)) to smoothly enter an area of the bathing robot to be coupled to the bathing robot; and external device rails 625 and 648 which serve as a railroad, along which the external device moves, to correctly position the external device that has entered.

There is a coupling device 637 for coupling or connecting an external device to the bathing robot. The coupling device 637 includes a pipe 635 for supplying air, a pipe 699 for discharging wastewater, and a pipe 644 for supplying hot water. Lower pipe cases 633, 636, and 638 are provided between the external device rails 625 and 648, and nozzles 630, 634, 643, and 639 for cleaning or disinfecting an external device such as a user transfer device are provided therein.

Cameras 614 and 632 for scanning a body size and volume, a skin condition, or the like of a user are provided in the tunnel-shaped house 601. The cameras 614 and 632 have an image recognition function for communication with the user. An image, which is acquired by scanning a body size and skin of a user using the cameras 614 and 632 having an image recognition function, is analyzed to determine an amount, type, and the like of consumables required for bathing, drying, and skincare of the user to autonomously apply an adequate amount and adjust a time for each operation. In addition, an input/output device 653, for example, a touch panel monitor, through which a protector or manager inputs a bathing robot control command or an operating state of the bathing robot is output, is attached outside the house 601. Through the input/output device 653, a protector or manager may monitor a bathing situation of a user and may control necessary functions.

Those skilled in the art can easily implement such an autonomous function of the bathing robot through an autonomous execution unit for autonomously operating a reciprocating motion of the house, nozzles for supplying and spraying water to the external device and autonomously operating the nozzles for supplying and spraying a cleaning agent, devices for performing a drying function, and devices for performing skincare or sterilization with reference to flowcharts of a software program of FIGS. 9 to 21.

Nozzles 610, 627, 628, 615, 616, 642, 619, 640, and 646 for supplying and spraying water and nozzles 613, 612, 618, and 641 for supplying and spraying a cleaning agent are provided at an upper portion inside the house 601. Nozzles 622, 621, 650, 603, 604, and 605 for supplying and spraying water are provided on side surfaces inside the house 601. Devices 608, 624, 611, 629, 617, 647, 620, and 645 for performing a drying function are provided at the upper portion inside the house 601, and devices 602, 606, 623, and 652 for performing a drying function are also provided on side surfaces inside the house 601. Devices 609 and 631 for skincare or disinfecting or sterilization are also provided at the upper portion inside the house 601.

Figure 2:
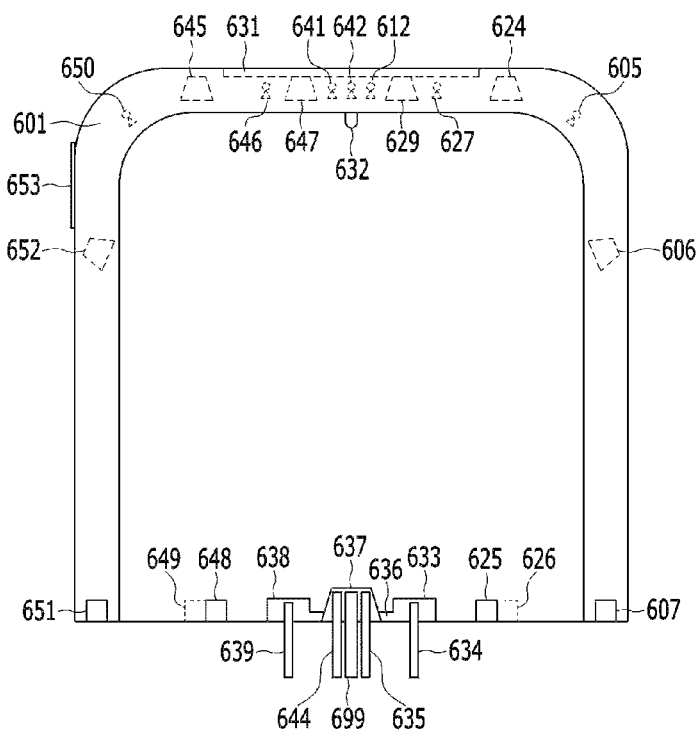
FIG. 2 is a front view of the bathing robot.

FIG. 2 is a front view of the bathing robot. It can be seen that the house 601 of the bathing robot is placed on the house rails 651 and 607.

As shown in FIG. 1, the nozzles 646, 642, and 627 for supplying and spraying water, the nozzles 641 and 612 for supplying a cleaning agent, the device 631 for the skincare or sterilization, the devices 645, 647, 629, and 624 for drying, and the camera 632 for scanning a body size and volume, a skin condition, or the like of a user are provided at the upper portion inside the house 601. The nozzles 650 and 605 for spraying and supplying water, and the devices 652 and 606 for drying are provided at a front side inside the house. The input/output device 653 is provided on an outer side surface of the house. At the bottom of the bathing robot, the entry guides 649 and 626 and the external device rails 648 and 625 which guide external devices such as transfer devices, the pipe 644 for supplying water to the external device, the pipe 635 for supplying air, the pipe 699 for discharging wastewater, and pipes connecting the nozzles 639 and 634 for cleaning or disinfecting the external device. A coupling device 637 ties the above pipes and fixes the external device. In addition, there are covers 638, 636, and 633 for protecting the various pipes at the bottom of the bathing robot.

Figure 3:
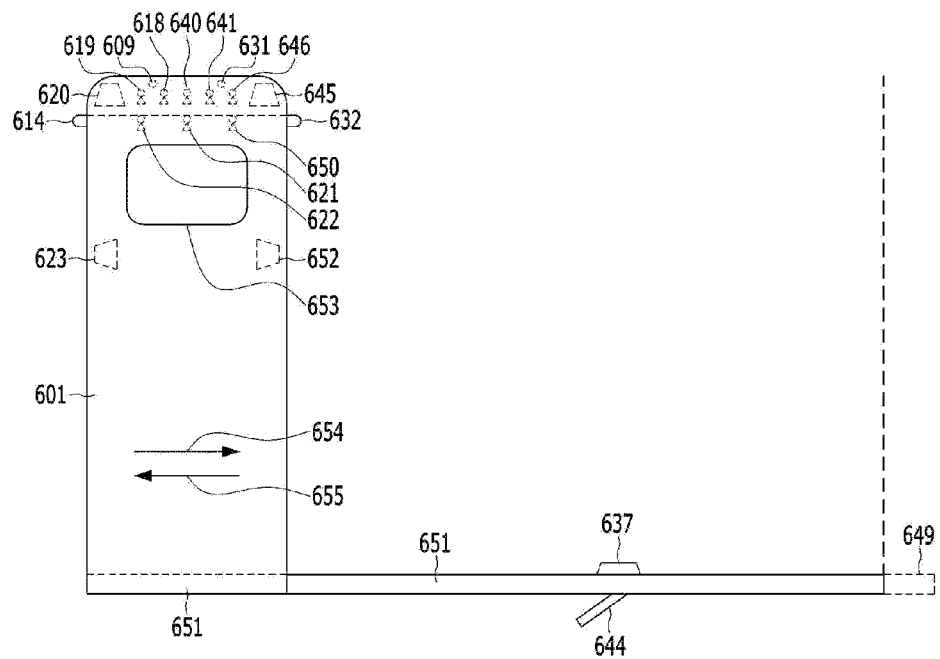
FIG. 3 is a left-side view of the bathing robot.

FIG. 3 is a side view of the bathing robot. The house 601 of the bathing robot reciprocates laterally along the house rail 651 to a position on the right side indicated by a vertical dotted line (as indicated by arrows 654 and 655) to supply/spray water, air, a cleaning agent, or the like to the external device (a user transfer device, a bath stand, or the like) fixedly coupled to the coupling device 637, blow air to dry the external device, and perform skincare or sterilization using chemicals and a sterilizing lamp.

In FIG. 3, it can be seen that the pipe 644 for supplying water, the pipe for supplying air, the pipe for discharging wastewater, and the coupling device 637 for fixing the pipes and coupling a transfer device are provided at the bottom of the bathing robot. It can be seen that the nozzles 619, 640, 646, 622, 621, and 650 for supplying and spraying water, the nozzles 618 and 641 for supplying and spraying a cleaning agent, the devices 623, 620, 645, and 652 for drying, the devices 609 and 631 for skincare or sterilization, and the input/output device 653 are provided at the upper portion of the house 601.

Figure 4:
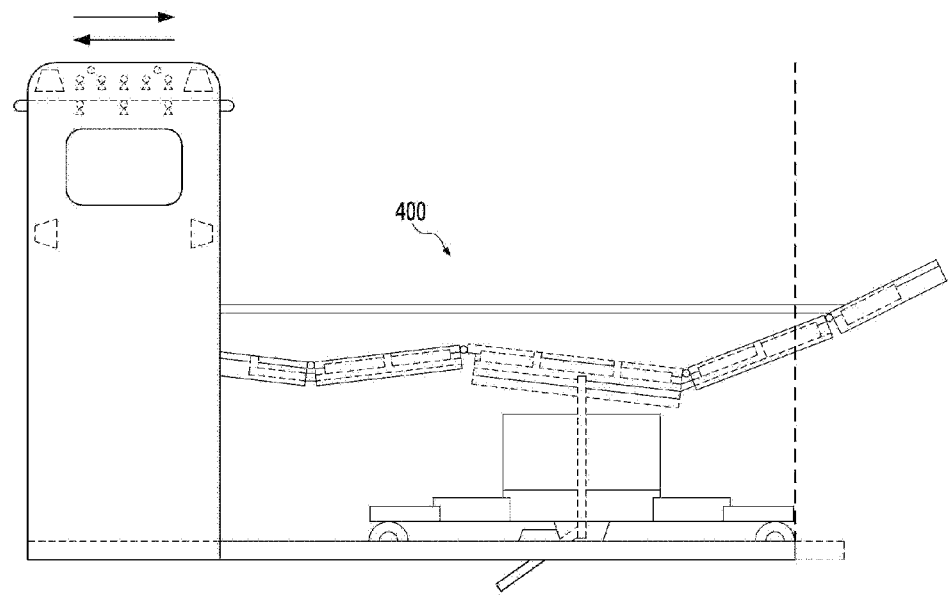
FIG. 4 is a left-side view in which the bathing device and a transfer device are coupled.

FIG. 4 is a side view in which a user transfer device 400, which is a kind of external device, is coupled to the bathing robot of the present invention. The transfer device 400 having a form as shown in FIG. 4 enters through the entry guides 626 and 649 on the bottom of the bathing robot of the present invention and moves to a set position along the external device rails 625 and 648 to be coupled at a corresponding position by the coupling device 637. In this state, the bathing robot moves laterally for a set time to scan a body of a user sitting or lying on the transfer device 400 and perform washing, drying, or skincare or clean, disinfect, or dry the transfer device 400 itself.

Figure 5:
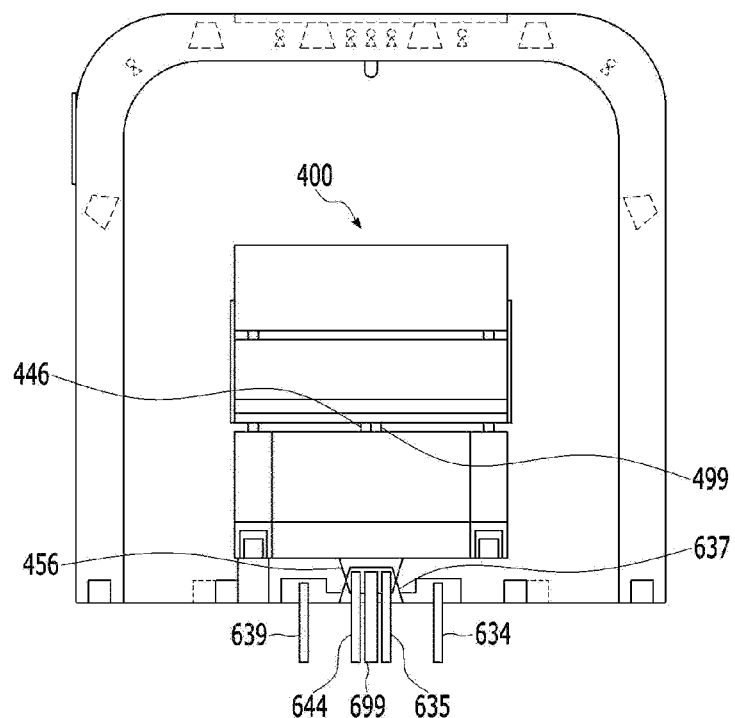
FIG. 5 is a front view in which the bathing device and the transfer device are coupled.

FIG. 5 is a front view for further describing a relationship between the bathing robot and the user transfer device 400. The pipe 644 for supplying water, the pipe 635 for supplying air, and the pipe 699 for discharging wastewater in the coupling device 637 at the bottom of the bathing robot are connected to a pipe 446 for supplying water and air and a pipe 499 for discharging wastewater through a coupling device 456 of the transfer device 400.

An example of the user transfer device 400 will be described in more detail with reference to FIGS. 6 and 7. Here, the transfer device 400 has a structure which transmits a user in a lying state or posture, is coupled to the rails of the bathing robot to allow the user to receive a bathing service, serves as a bathtub through a waterproof membrane 489 being raised around an upper plate, and cooperates with the bathing robot of the present invention.

Figure 6:
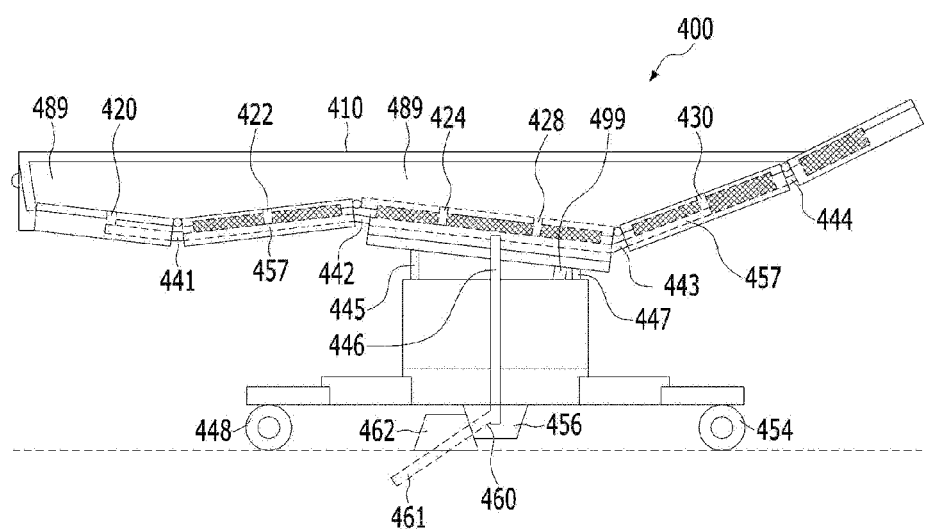
FIG. 6 is a side view of a transfer device (400) for bathing assistance.
Figure 7:
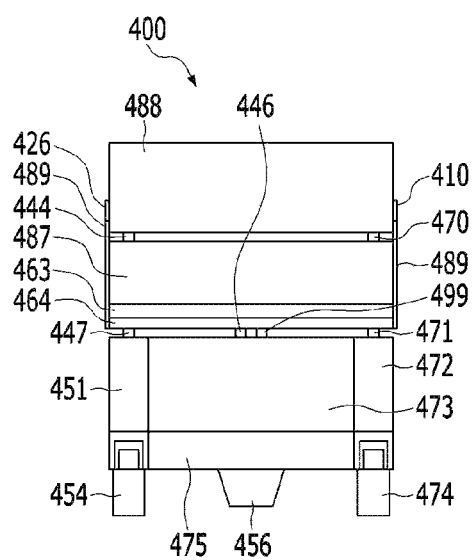
FIG. 7 is a rear view of the transfer device (400) of FIG. 6.

FIG. 6 is a side view of the user transfer device 400, and FIG. 7 is a rear view thereof.

A shape of the upper plate including five divided upper plates is adjusted at various angles and heights by manual or electric pivot mechanisms 441, 442, 443, and 444. There is the pipe 446 for supplying water and air to each nozzle of the divided upper plate, and there is the pipe 499 for discharging water from the upper plate. Also, there are wheels 448 and 454 for manually or electrically moving and steering the transfer device. A pipe connector 456, which is connected to a water supply facility to receive water and air for bathing and is connected a sewage facility 461 to discharge water, is installed under the upper plate. The pipe connector 456 also serves as a coupling device of the transfer device which is coupled to the coupling device 462 (637 in FIG. 3) at a bottom of the bathing robot.

FIG. 6 illustrates a state in which each divided upper plate of the upper plate of the transfer device 400 for bathing assistance is manually or electrically transformed in a shape in which the knees of a user are raised, the hip is lowered, and the back and head are raised to perform a bathing assistance function. In addition, the upper plate includes a first nozzle 420, a second nozzle 422, a third nozzle 424, a fourth nozzle 428, and a fifth nozzle 430 for supplying water and air, pipes 446, 457, 460, and 461 for supplying water and air to the nozzles, and the pipe 499 for discharging wastewater. FIG. 6 illustrates a state after, in order to use the upper plate of the transfer device 400 as a bathtub, a waterproof membrane frame 410 installed around the upper plate is raised to block a periphery of the upper plate with a waterproof membrane 489 attached thereto to form the bathtub. FIG. 7 is presented to clearly show this state.

FIG. 7 is a rear view of the transfer device 400 for bathing assistance in FIG. 6. It can be seen that, in order to make a bathtub on the upper plate, waterproof membrane frames 410 and 426 installed around the upper plate are raised, and the waterproof membrane 489 is raised along the periphery of the upper plate to form the bathtub thereon.

The user transfer device 400 can be used in the bathing robot of the present invention as shown in FIGS. 4 and 5.

<Autonomous Execution Scenario of Bathing Robot>

Figure 8:
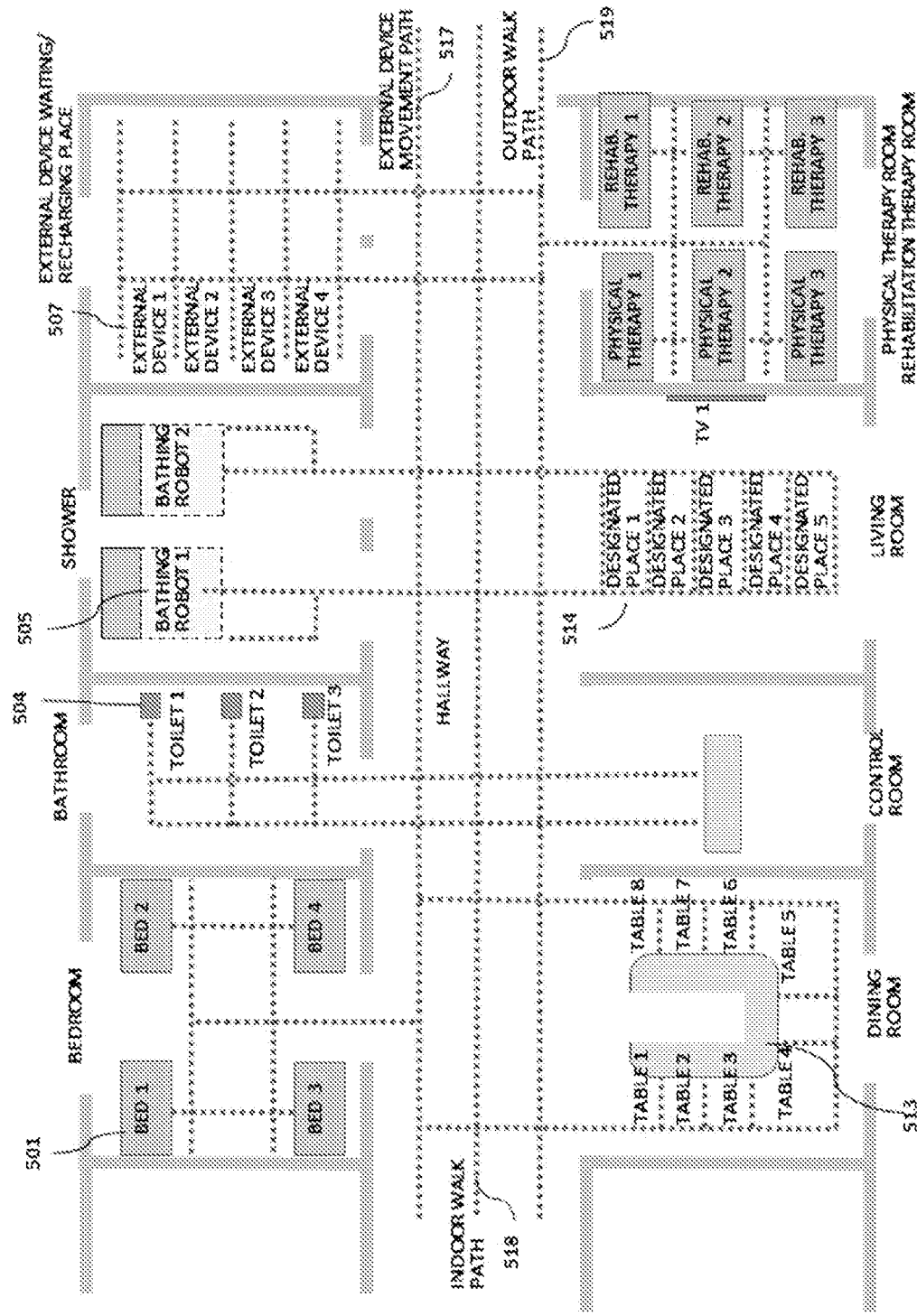
FIG. 8 is an exemplary view of a scenario in which a bathing robot autonomously performs functions according to the present invention.

FIG. 8 is an exemplary view of a scenario in which a bathing robot autonomously performs functions according to the present invention. Cooperation with an external device such as a user transfer device (robot) or a bathing stand (table) is required for autonomous executions of the bathing robot.

While external devices 507 wait in a waiting place, when a user in a bed-1 501 of a bedroom wants to take a bath, the bed-1 501 transmits a bathing preparation signal to a bathing robot-1 505 in a shower in a wired/wireless communication manner, and the bathing robot-1 505 receiving the signal calls the external device-1 507 (for example, the user transfer device 400 of FIG. 5) that performs bathing assistance. In another scenario, when the user wants to take a bath, the bed-1 501 may directly call the external device-1 507 for bathing assistance without calling a bathing robot-2 505.

The external device-1 507 receiving the call from the bed-1 501 moves to the bedroom to be coupled to the bed-1 501. The bed-1 501 and the external device-1 507 cooperate to shift the user from the bed-1 501 to the external device-1 507 and put the user on the external device-1 507, and while carrying the user, the external device-1 507 moves to the shower. When the external device-1 507 arrives at the shower, while carrying the user, the external device-1 507 is coupled to the bathing robot-1 505 so that the bathing robot-1 505 performs a bathing operation in the order of scanning, washing, drying, and skincare for the user. After the bathing operation is completed, the external device-1 507 separates from the bathing robot-1 505, and the external device-1 507 returns the user to the bedroom.

After completing its mission, the unoccupied external device-1 507, which has left the bedroom, enters the shower again for self-cleaning or self-sterilizing to be coupled to the bathing robot-1 505 or a bathing robot-2. The bathing robot-1 505 or the bathing robot-2 cleans or disinfects the external device-1 507 for a set time, the external device-1 507, which has been cleaned or disinfected, returns to the external device waiting place to wait.

<Software Algorithm for Autonomous Execution>

Figure 9:
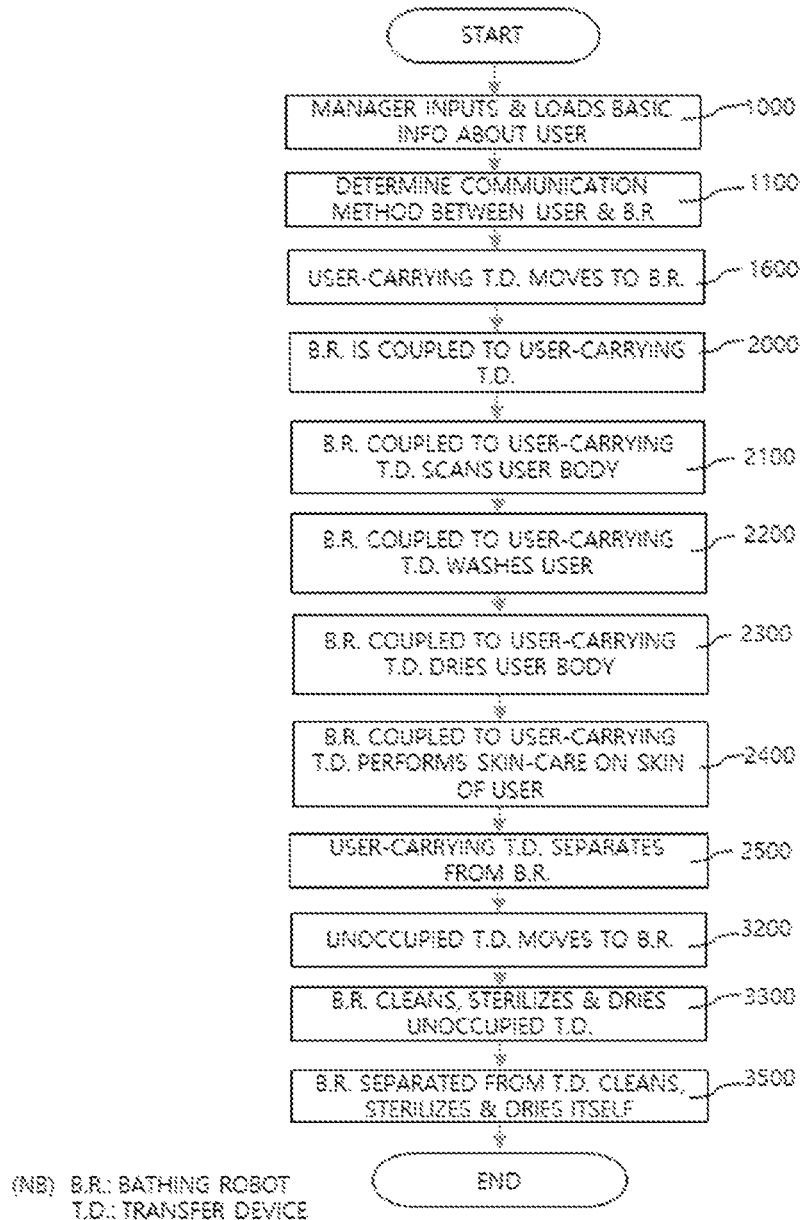
FIGS. 9 to 21 are flowcharts of a software program that performs a function and control of a bathing robot of the present invention.
Figure 10:
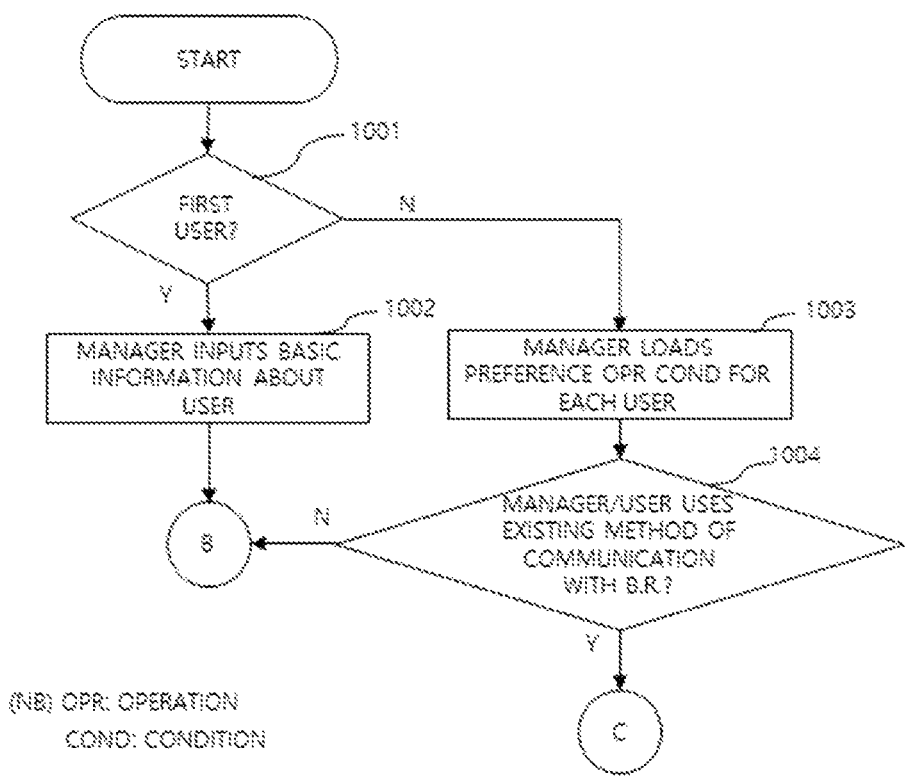
Figure 11:
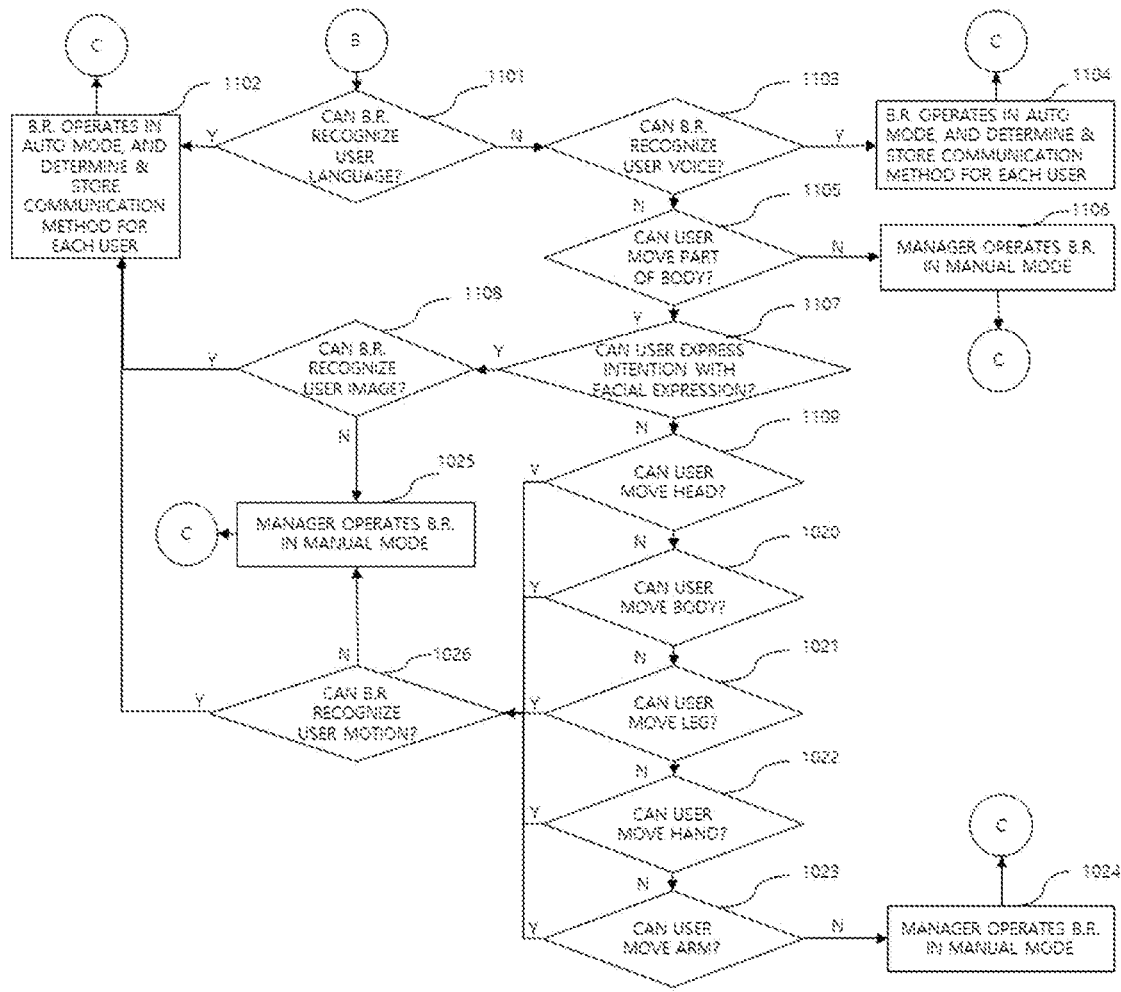
Figure 12:
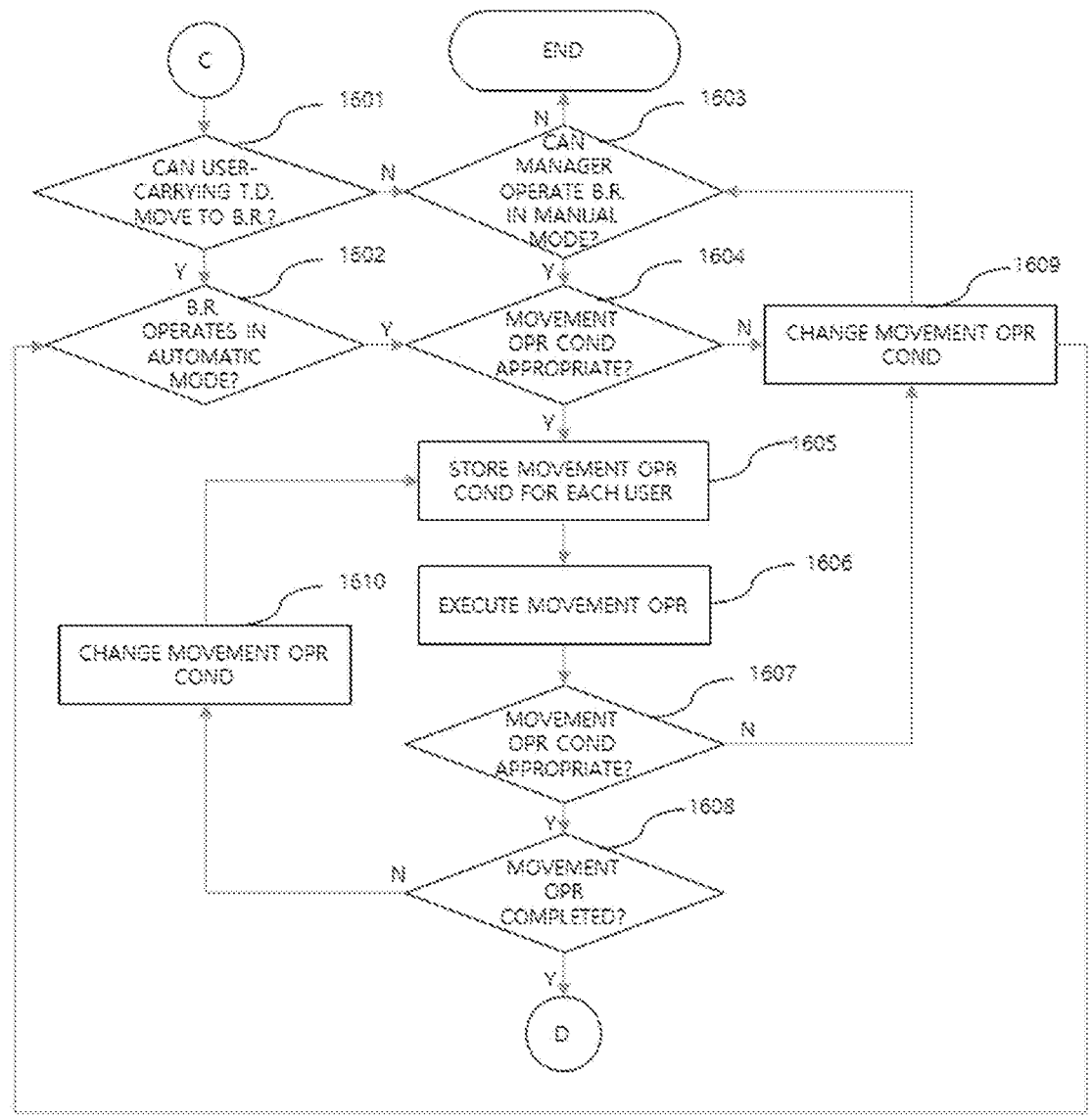
Figure 13:
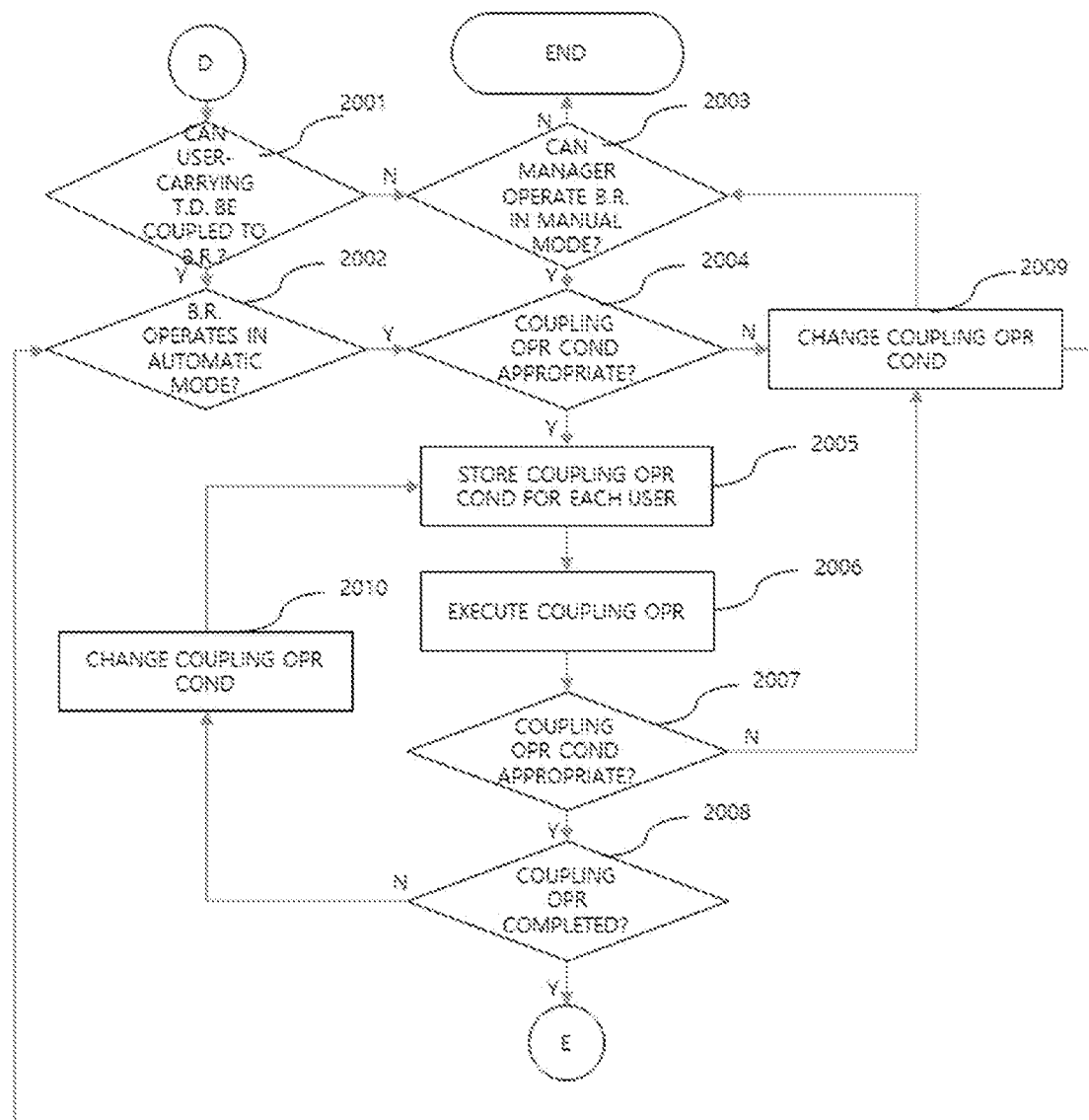
Figure 14:
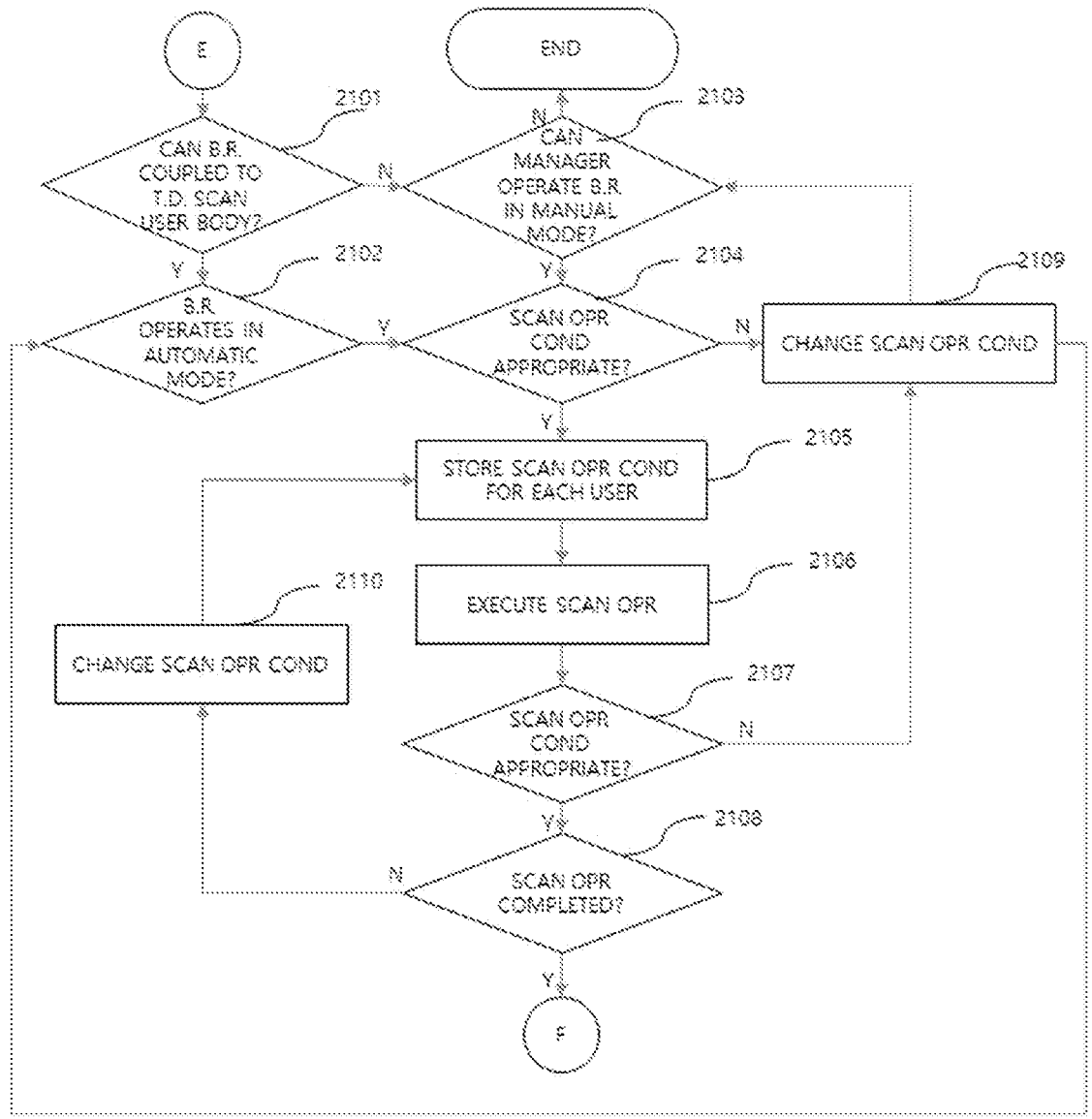
Figure 15:
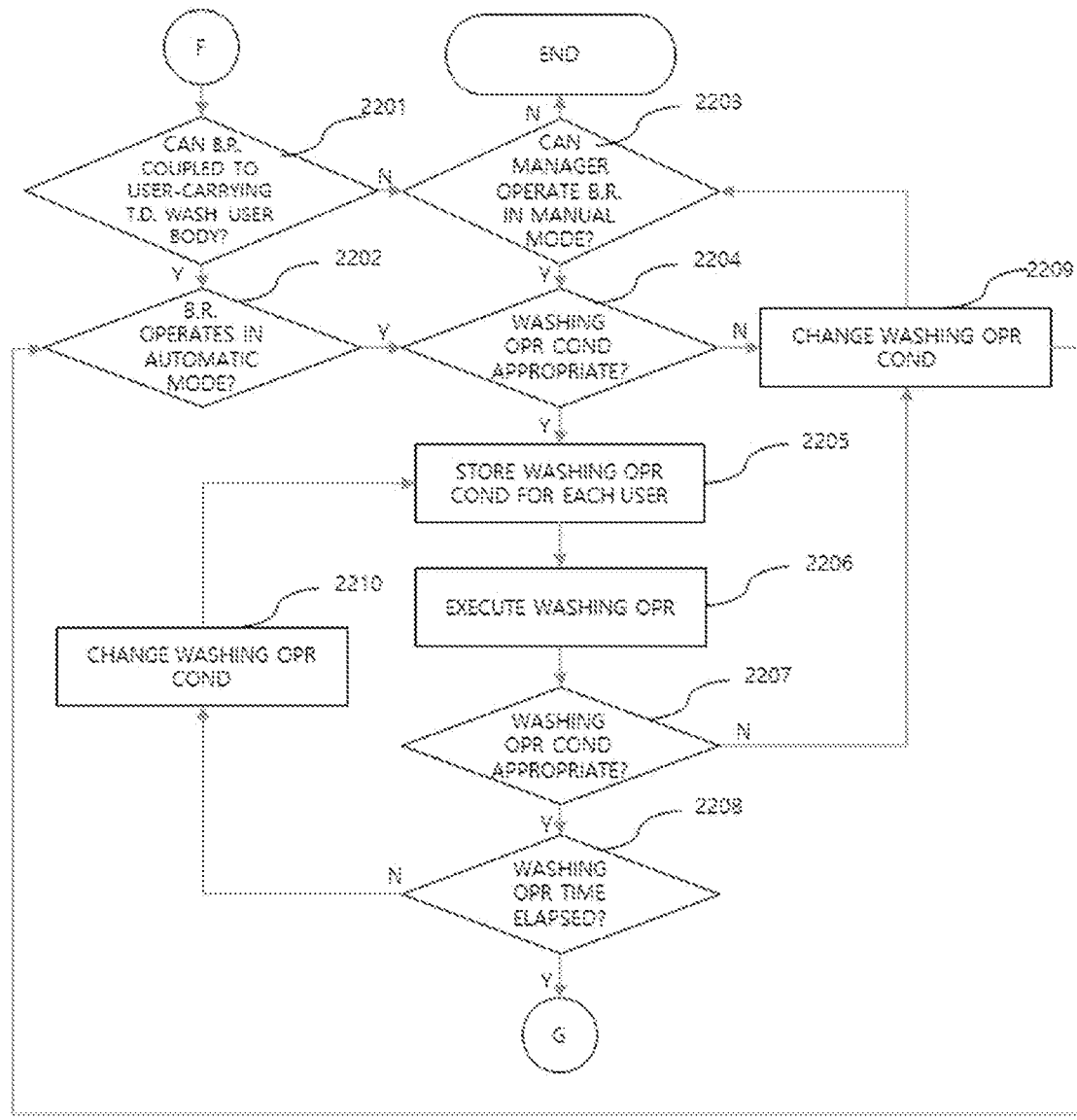
Figure 16:
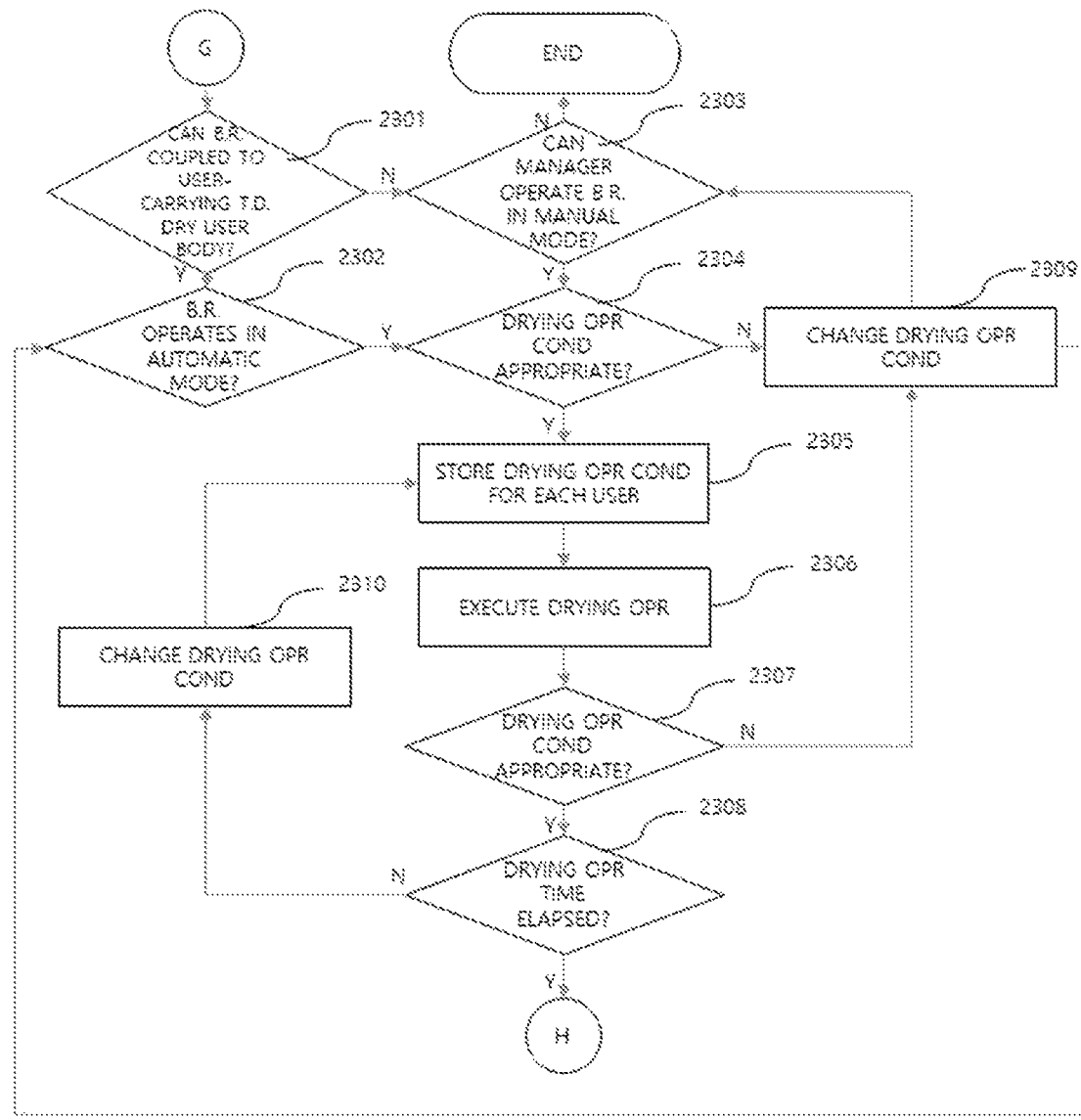
Figure 17:
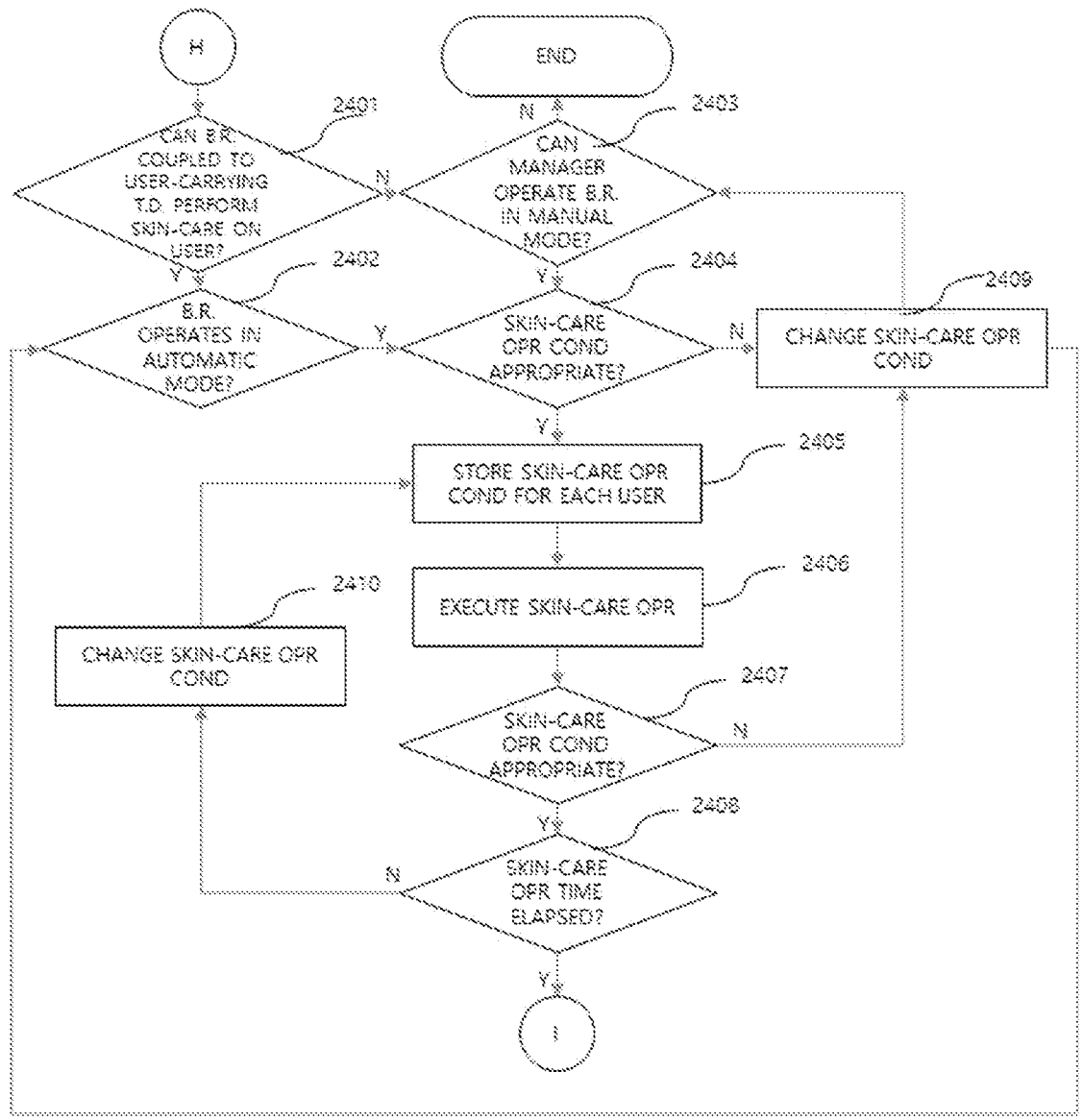
Figure 18:
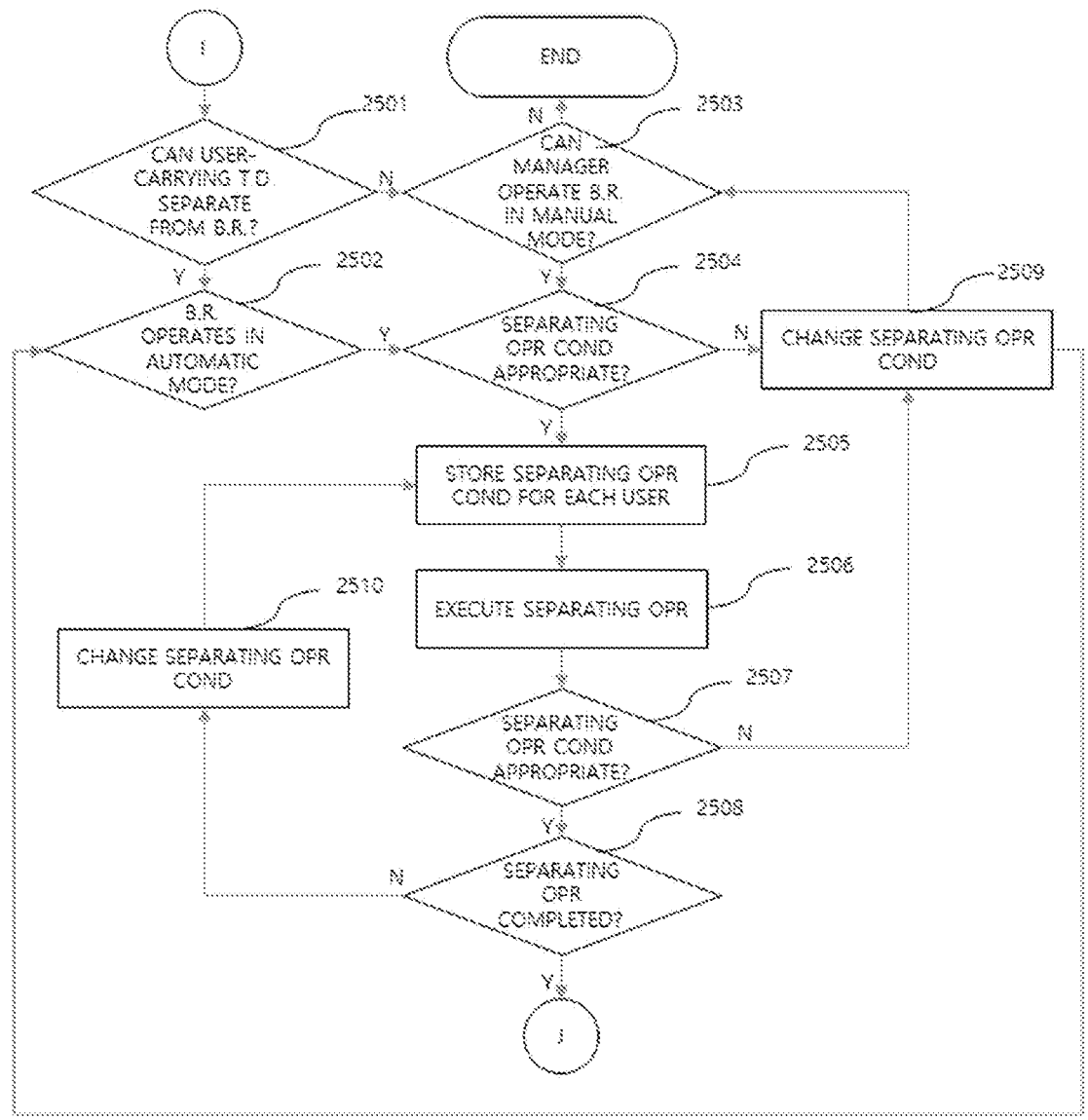
Figure 19:
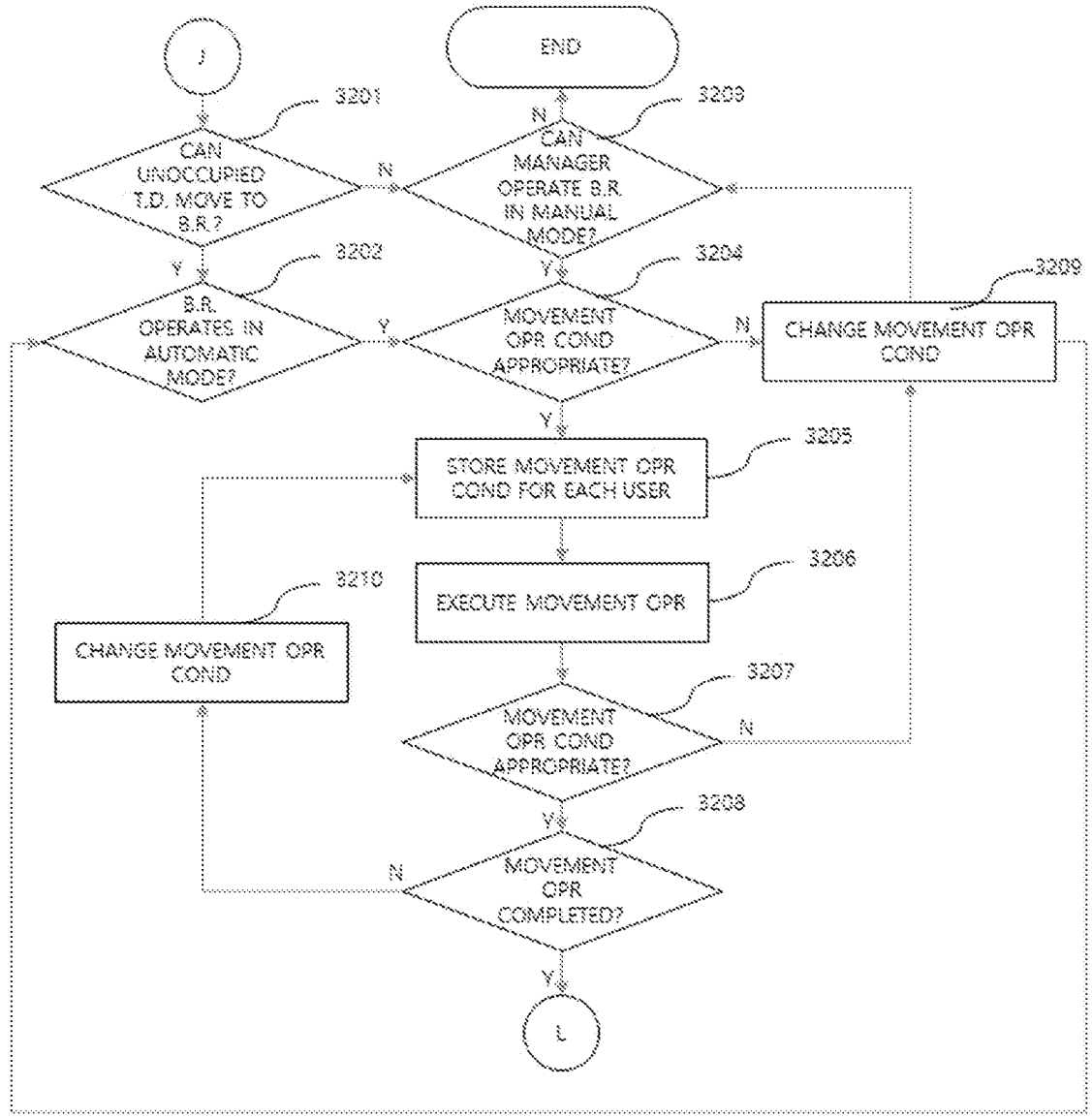
Figure 20:
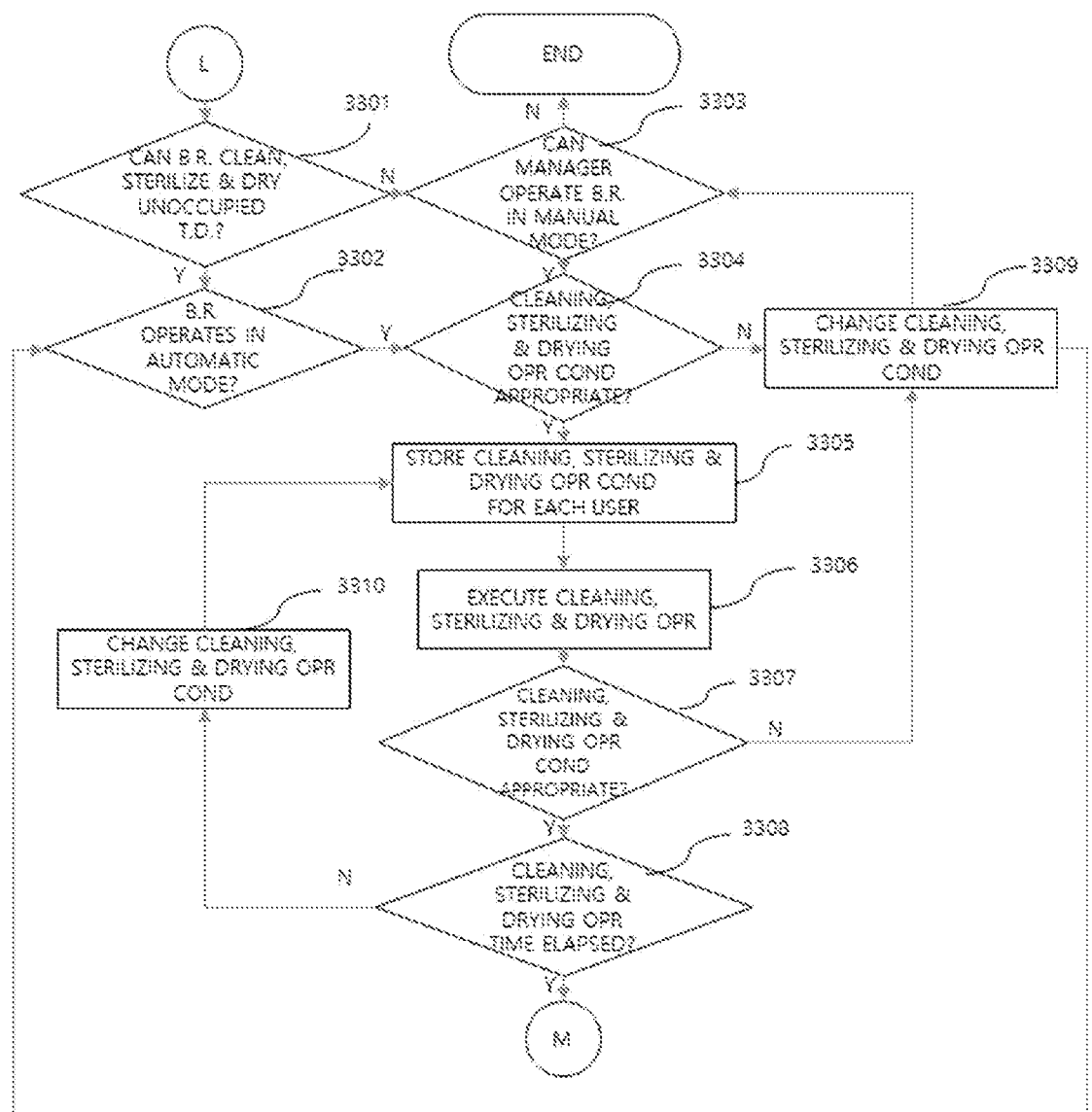
Figure 21:
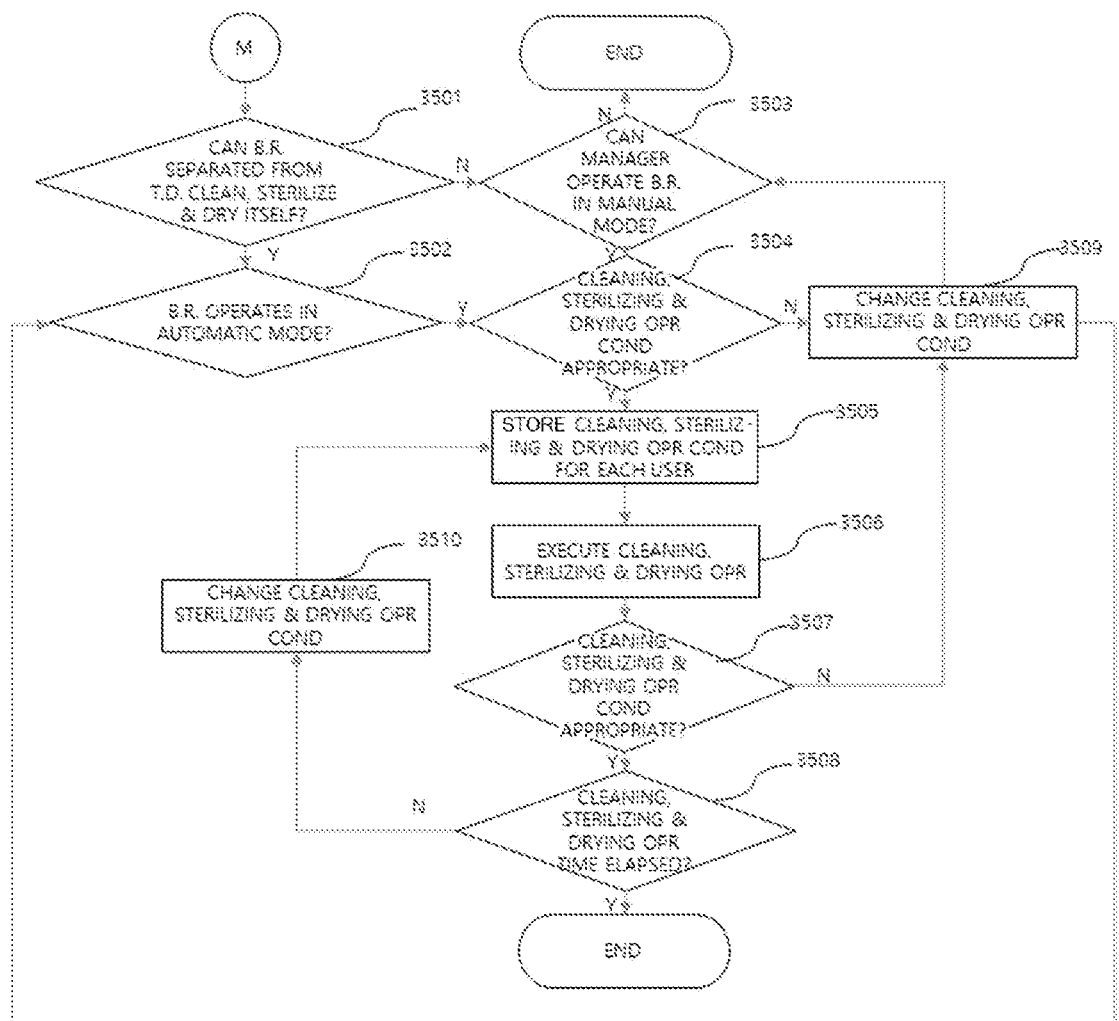

A bathing robot of the present invention can operate fully autonomously using artificial intelligence and automatic control technology. From the viewpoint of such an autonomous execution robot, the function and control of the bathing robot of the present invention are described through a software program with reference to the drawings subsequent to FIG. 9. FIG. 9 is a schematic diagram of a software program to be included in the bathing robot. FIGS. 10 to 21 illustrate detailed routines for each processing procedure in an outline of the program of FIG. 9. A routine in which the bathing robot of the present invention interacts with other external devices, for example, user transfer devices, beds, and bed stands, to perform autonomous functions is described. Autonomous functions of the bathing robot of the present invention described above can be easily implemented by those skilled in the art with reference to flowcharts of the software program of FIGS. 9 to 21.

The function or process of each component of the bathing robot according to the present invention can be implemented with a hardware element including at least one of a digital signal processor (DSP), a processor, a controller, an application-specific integrated circuit (ASIC), a programmable logic device (FPGA or the like), and other electronic devices, and a combination thereof. In addition, the function or process of each component of the transfer robot can be implemented with software combined with hardware elements or independently, and the software can be stored in a recording medium.

Although the present invention has been described with reference to exemplary embodiments of the present invention, it will be understood by those skilled in the art to which the present invention pertains that the present invention can be carried out in specific forms other than those disclosed herein without changing the technical spirit and essential features thereof. Therefore, it should be understood that the embodiments described herein are illustrative and not restrictive in all aspects. The scope of the present invention is defined by the scope of the attached claims, rather than the detailed description. It should be appreciated that all variations and modifications derived from the scope of the claims and the equivalent concepts thereof are included in the scope of the present invention.

The invention claimed is:

1. A bathing robot device comprising:
   a house configured to reciprocate along a rail and be open at both ends;
   a house rail configured to guide the house to reciprocate and be installed on a floor surface;
   an external device rail configured to be installed on the floor surface, the external device rail serving as a railroad to position an external device carrying an object in a correct position; and
   a coupling device configured to couple and fix the external device,
   wherein the house includes:
   a first nozzle configured to supply and spray water to the external device coupled to the external device rail;
   a second nozzle configured to supply and spray a cleaning agent;
   a first device configured to perform a drying function; and
   a second device configured to perform skincare or sterilization.

2. The bathing robot device of claim 1, wherein the house further includes a camera configured to scan the object on the external device.

3. The bathing robot device of claim 1, wherein the house further includes:
   a camera configured to scan the object on the external device; and
   a part which analyzes an image, which is acquired by scanning the object using the camera, to determine an amount and type of consumables required for bathing, drying, and skincare of the object and adjust a bathing time.

4. The bathing robot device of claim 1, wherein the house further includes an input/output device through which a control command for the bathing robot device is input and an operating state of the bathing robot device is output.

5. The bathing robot device of claim 1, further comprising:
   a first pipe through which water is supplied to the external device;
   a second pipe through which air is supplied to the external device; and
   a third pipe through which wastewater is discharged.

6. The bathing robot device of claim 1, further comprising a part configured to clean and disinfect the external device.

7. The bathing robot device of claim 1, further comprising a part configured to perform communication with an external environment.

8. The bathing robot device of claim 1, further comprising an autonomous execution unit configured to autonomously execute a reciprocating motion of the house and autonomously operate the first nozzle configured to supply and spray water, the second nozzle configured to supply and spray the cleaning agent, the first device configured to perform the drying function, and the second device configured to perform the skincare or sterilization.

* * * * *